United States Patent [19]

Nomura et al.

[11] Patent Number: 4,729,221
[45] Date of Patent: Mar. 8, 1988

[54] PRESSURE GENERATING DEVICE WITH PRESSURE RELIEF MEANS

[75] Inventors: Yoshihisa Nomura, Toyota; Masakazu Sugisawa, Takahama, both of Japan

[73] Assignees: Toyota Jidosha Kabushiki Kaisha, Toyota; Aisin Seiki Kabushiki Kaisha, Kariya, both of Japan

[21] Appl. No.: 14,584

[22] Filed: Feb. 13, 1987

[30] Foreign Application Priority Data

Feb. 13, 1986 [JP] Japan .................. 61-29341
Feb. 13, 1986 [JP] Japan .................. 61-29342
Feb. 13, 1986 [JP] Japan .................. 61-29343

[51] Int. Cl.$^4$ ............................................. F16D 31/02
[52] U.S. Cl. .......................................... 60/416; 60/418
[58] Field of Search ............... 60/413, 415, 416, 418

[56] References Cited

U.S. PATENT DOCUMENTS 868,718 10/1907 Smith .................................. 60/416
2,764,999 10/1956 Stanbury ........................ 60/416 X
3,587,233 6/1971 Fischbach ........................... 60/418

FOREIGN PATENT DOCUMENTS

61-131501 8/1986 Japan .

Primary Examiner—Edward K. Look
Attorney, Agent, or Firm—Oblon, Fisher, Spivak, McClelland & Maier

[57] ABSTRACT

A pressure generator having a high-pressure accumulator connected to a high-pressure pump by a high-pressure conduit via a first check valve, to store a high-pressure fluid from the high-pressure pump, a charging accumulator connected to the high-pressure pump, for storing a low-pressure fluid and supplying the high-pressure pump with the low-pressure fluid, and a charging pump for supplying the charging accumulator with the low-pressure fluid. The charging accumulator includes leak means for permitting the low-pressure fluid to leak at a low rate. The high-pressure conduit is connected to a storage chamber of the charging accumulator by a communication passage in which is disposed a second check valve for preventing a flow of the fluid from the high-pressure conduit toward the charging accumulator. A valve actuator is provided on one of a piston of the charging accumulator and a valve member of the second check valve, in order to open the second check valve after the fluid in the charging accumulator has leaked out. A valve control device may be provided as to hold the second check valve open for a suitable time immediately after the high-pressure pump is started.

10 Claims, 5 Drawing Figures

18: PROPORTIONING VALVE
22: REAR-WHEEL BRAKE CYLINDERS
82: PRESSURE SWITCH

FIG.1

18: PROPORTIONING VALVE
22: REAR-WHEEL BRAKE CYLINDERS
82: PRESSURE SWITCH

PRESSURE GENERATING DEVICE WITH PRESSURE RELIEF MEANS

BACKGROUND OF THE INVENTION

1. Field of the Invention

The present invention relates to a hydraulic pressure generating device capable of pressurizing a fluid in two steps, having a high-pressure accumulator, a high-pressure pump for supplying the high-pressure accumulator with a high pressure fluid, a charging accumulator for charging the high-pressure pump with a relatively low-pressure fluid, and a charging pump for charging the charging accumulator.

2. Discussion of the Prior Art

A pressure generating device of the type indicated above is used for example, for an anti-skid or anti-lock hydraulic braking system for an automotive vehicle. The high-pressure pump is operated in an intermittent manner. Namely, the high-pressure pump is turned on when the pressure in the high-pressure accumulator has fallen below a preset lower limit, and is turned off when the pressure in the high-pressure accumulator has been raised to a preset upper limit.

In the case where a pressure generating device including a high-pressure accumulator is used for an anti-skid hydraulic braking system for a motor vehicle, the high-pressure accumulator stores the working fluid having a high pressure in the neighborhood of 200 Kg/cm$^2$. When it becomes necessary to control the pressures in brake cylinders, for preventing the vehicle wheels from locking, the fluid stored in the high-pressure accumulator is delivered to a pressure regulating device.

A similar pressure generating device is used for activating a hydraulic booster which is used in a braking system for a motor vehicle, for boosting an operating force applied to a brake pedal or other operating member, so that the boosted force is applied to a master cylinder. While the braking system is at rest, the high-pressure pump is operated to store the fluid under a high pressure in the high-pressure accumulator. When the braking system is activated, the pressurized fluid is delivered from the high-pressure accumulator to the booster. Further, a pressure generating device is used for a traction control device in the vehicle braking system, for preventing the wheels from slipping on the road surface due to excessive drive forces.

In some braking systems, it is desirable that a high-pressure conduit is freed from a high pressure while the high-pressure pump is at rest. For instance, where the high-pressure conduit of a hydraulic system includes a flexible rubber hose, it is preferred to reduce the period during which the rubber hose is subjected to a high pressure, in order to prevent deterioration of the hose and increase the life expectancy of the hose. It is also preferred that a pump motor for the high-pressure pump is protected against an initial high pumping load upon starting, due to a high fluid pressure in the high-pressure conduit connected to the high-pressure pump.

In the pressure generating device for an anti-skid braking system for a motor vehicle, for example, a flexible high-pressure hose is used for connecting the high-pressure pump and the high-pressure accumulator, in such a manner as to allow a relative movement between the accumulator and the pump. The high-pressure flexible hose is subjected to a relatively high pressure, while the pump is operating, and even while the pump is at rest. This leads to shorting the life expectancy of the hose. In the light of this inconvenience, the assignee of the present invention proposed a pressure generating device as disclosed in Laid-Open Publication No. 61-131501 (published on Aug. 16, 1986) of Japanese Patent Application, wherein the high-pressure hose is freed from a high pressure while the pump is at rest. More specifically, a check valve is disposed between the high-pressure hose and the high-pressure accumulator, for preventing a flow of the fluid out of the high-pressure accumulator. Further, between the check valve and the high-pressure pump, there is provided depressurizing means for releasing the pressure in the high-pressure hose when the pump is turned off.

However, the above solution was not offered for a pressure generating device equipped with a charging pump and a charging acculator in addition to a high-pressure pump and a high-pressure accumulator. The present invention was developed to provide pressure relief means for such a pressure generating device, by utilizing the charging accumulator which functions to charge the high-pressure pump.

The pressure generating device indicated above suffers from another drawback. Stated in greater detail, when the pressure in the high-pressure accumulator has been lowered below the preset lower limit, the high-pressure pump is turned on to charge the high-pressure accumulator with the fluid pressure of the nominal level. The lower limit is set at a relatively high level, e.g., 140 Kg/cm$^2$, sufficiently high to activate the booster of the braking system, for example. Therefore, the high-pressure pump must be operated to push the pressurized fluid into the high-pressure accumulator, against the relatively high pressure in the accumulator, from the very start of each pumping cycle. In other words, the pump motor for driving the high-pressure pump must receive this relatively high initial pumping load, as well as a load due to inertia of the pump motor and the high-pressure pump, when the pump device is started. Accordingly, the pump motor must have a relatively large capacity, enough to provide a relatively high power upon starting.

A DC motor is widely used as the pump motor for the high-pressure pump. In this case, the starting current applied to the DC motor is extremely high, resulting in rapid wear of the motor brush, and shortened service life of the motor.

The high-pressure pump may be driven by an engine of an automotive vehicle or other drive source provided for driving another device or component, via a clutch for selective connection of the drive source to the high-pressure pump. In this case, the capacity of the clutch must be commensurate with the load applied to the drive source upon starting. Further, the operation of the high-pressure pump causes a relatively large variation in the load being applied to the drive source such as the vehicle engine.

The above inconveniences or drawbacks will be encountered even if the pressure generating device is used for devices or systems other than a hydraulic braking system for automobiles.

SUMMARY OF THE INVENTION

It is accordingly an object of the present invention to provide a pressure generating device having a charging accumulator and a charging pump in addition to a high-pressure accumulator and a high-pressure pump connected to each other by a high-pressure conduit, wherein pressure relief means is provided for releasing the pressure in the high-pressure conduit when the device is turned off.

Another object of the present invention is the provision of a pressure generating device having a charging accumulator and a charging pump in addition to a high-pressure accumulator and a high-pressure pump, wherein pressure relief means is provided for protecting the high-pressure pump from an initial high pumping load for a certain period following the start of the high-pressure pump.

A further object of the invention is to provide such pressure relief means by utilizing the charging accumulator.

According to one aspect of the present invention, there is provided a pressure generating device having (a) a high-pressure accumulator for storing a fluid under a high pressure and delivering the fluid to a hydraulic component, (b) a high-pressure conduit connected at one end thereof to the high-pressure accomulator via a first check valve, (c) a high-pressure pump connected to the other end of the high-pressure conduit, to supply the high-pressure accumulator with the fluid under the high pressure, (d) a charging accumulator of a piston type including a piston and having a storage chamber connected to the high-pressure pump, for storing the fluid under a low pressure lower than that of the fluid in the high-pressure accumulator, and supplying the high-pressure pump with the fluid under the low pressure, and (e) a charging pump for supplying the charging accumulator with the fluid under the low pressure, wherein the improvement includes: leak means provided in the charging accumulator, for permitting the fluid stored therein under the low pressure, to leak at a low rate; a communication passage for communication between the high-pressure conduit and the storage chamber of the charging accumulator; a second check valve disposed in the communication passage, and including a valve member for preventing a flow of the fluid from the high-pressure conduit toward the charging accumulator; and a valve actuator provided between the piston of the charging accumulator and the valve member of the second check valve. The valve actuator is operable for holding the second check valve open while no fluid is stored in the charging accumulator.

In the pressure generating device of the present invention constructed as described above, the communication passage is closed by the second check valve and the high-pressure conduit is disconnected from the charging accumulator, while the high-pressure pump and the charging pump are being operated. In this condition, therefore, an entire volume of the fluid delivered from the high-pressure pump is supplied to the high-pressure accumulator. When the high-pressure pump is turned off, the charging pump is also turned off. While the pumps are off, the fluid in the storage chamber of the charging accumulator leaks through the leak means. Hence, in a given time after the charging pump is turned off, the charging accumulator is restored to its original position in which no fluid is stored in its storage chamber. In other words, the piston of the charging accumulator is returned to its original position in which the valve actuator holds the second check valve in the open position. As a result, the high-pressure conduit is brought into communication with the charging accumulator, through the communication passage, whereby the high-pressure conduit is depressurized. Thus, the high-pressure conduit is freed from a high fluid pressure while the high-pressure pump is off, and the life expectancy of the conduit is increased.

Since the second check valve is opened by a mechanical force produced by the movement of the piston of the charging accumulator back to the original position, no electrical control means is necessary. Therefore, the pressure relief means according to the present invention is comparatively reliable, and is available at a reduced cost.

According to one feature of the invention, the valve actuator consists of a projection which protrudes from one of the piston of the charging accumulator and the valve member of the second check valve.

In the case where a part of the high-pressure conduit consists of a flexible hose, the arrangement according to the invention is particularly effective.

According to one advantageous feature of the invention, the second check valve is held open for at least a period until a load of the high-pressure pump due to an inertia is lowered to a predetermined level after the load has reached a maximum level after a start of the high-pressure pump. In this case, the nominal pumping load is applied to the high-pressure pump only after the load due to inertia of the pump device has been considerably reduced.

According to another feature of the invention, the valve actuator is provided on a plunger which is received in the piston slidably in an axial direction of the piston. Further, valve control means is disposed between the plunger and the piston, for keeping the plunger stationary to hold the second check valve open while the piston is retracted a predetermined distance from an advanced position thereof at which a volume of the storage chamber of the charging accumulator is minimum. The valve control means allows the second check valve to be closed when the piston is retracted more than the predetermined distance from the advanced position. The valve control means opens the second check valve against the pressure in the high-pressure conduit, when the piston is advanced to a position near the advanced position thereof.

According to the above feature of the invention, while the charging pump is at rest, the piston of the charging accumulator is placed in its advanced position, and the second check valve is held open by the valve actuator, whereby the high-pressure conduit communicates with the storage chamber of the charging accumulator.

When the high-pressure pump is started to charge the high-pressure accumulator, the charging pump immediately commences an effective pumping action. However, the high-pressure pump does not start an effective pumping action for a certain length of time after the starting, since the fluid pumped by the high-pressure pump flows into the charging accumulator through the communication passage. As the volume of the fluid stored in the storage chamber of the charging accumulator increases, the piston of the charging accumulator is retracted. But, the plunger having the valve actuator is held stationary, holding the second check valve open. Therefore, the nominal pumping load is not applied to the drive source for the high-pressure pump, until the piston of the charging accumulator has been moved to the retracted position at which the second check valve is allowed to be closed.

When the piston has been retracted by the predetermined distance, the valve actuator on the plunger allows the second check valve to be closed, thereby preventing the fluid delivered from the high-pressure pump, from being fed into the charging accumulator, and thus causing the delivered fluid to be supplied to the high-pressure accumulator through the hihg-pressure conduit. As a result, the norminal pumping load due to the pressure of the high-pressure pump is applied to the drive source for the high-pressure pump. By this time, however, the speed of the pump device including the drive source has been raised to a level near the nominal operating level, and consequently the load due to inertia of the pump device has been sufficiently reduced.

When the pressure in the high-pressure accumulator has reached the preset upper limit, the high-pressure and charging pumps are turned off. At this time, the piston of the charging accumulator is in the fully retracted position, and the second check valve is closed. Accordingly, a high-pressure fluid is trapped within the high-pressure conduit. However, the fluid stored in the storage chamber of the charging accumulator leaks through the leak means at a low rate, and the charging accumulator piston is slowly advanced. When the piston has been moved to a position near the fully advanced position, the valve actuator opens the second check valve, permitting the high-pressure fluid to flow from the high-pressure conduit into the charging accumulator.

As described above, the high-pressure pump does not start an effective pumping operation until a given length of time has passed after the high-pressure pump is started. Accordingly, the driving device for the high-pressure pump is freed from an initial high pumping load upon starting of the pump. Thus, the pressure generating device according to the instant feature of the invention may use a relatively inexpensive pump driving device which has a relatively small capacity.

If a DC drive motor is used as the pump driving device, the required starting current may be reduced, and the wear of the motor brush may be reduced. Hence, the motor life can be prolonged. Further, if an engine of a motor vehicle is used as the drive source for the pump device, a change in the load of the engine upon activation of the pump device can be reduced because of the starting load reduction of the high-pressure pump according to the above feature of the invention. The present feature also assures the freedom of the high-pressure conduit from a high-pressure fluid otherwise trapped therein after the pump device is turned off.

In one form of the above feature of the invention, the valve control means comprises: a spring for biasing the plunger toward the second check valve, the spring bearing at one end thereof on the plunger and at the other end thereof on the piston of the charging accumulator via a spring retainer which is movable in the axial direction; an engagement portion provided on the plunger such that the engagement portion engages the spring retainer to prevent the spring from biasing the plunger when the piston is retracted more than the predetermined distance from the advanced position thereof; and a stopper provided on the piston such that the stopper abuts on the plunger when the piston is advanced to the near-advanced position, and thereby moves the plunger and the piston as a unit while the piston is further advanced to the advanced position thereof.

According to another form of the same feature of the invention, the valve control means comprises a spring disposed between the piston of the charging accumulator and the plunger, for biasing the plunger toward the second check valve, and stop means for defining a range of relative movement between the piston and the plunger, such that the distance is smaller than a maximum operating stroke of the piston, the stop means causing the plunger to move together with the piston over distances outside the range of relative movement, to and from the advanced position and a retracted position of the piston which determine the maximum operating stroke.

According to a further form of the same feature of the invention, the valve control means comprises a spring disposed between the piston of the charging accumulator and the plunger, for biasing the plunger toward the second check valve, a biasing force of the spring being sufficient to open the second check valve against the pressure in the high-pressure conduit when the piston is placed in the advanced position. The biasing force of the spring is determined to allow the second check valve to be closed after the piston is retracted the predetermined distance from the advanced position thereof.

According to a further aspect of the invention, there is provided a pressure generating device having (a) a high-pressure accumulator for storing a fluid under a high pressure and delivering the fluid to a hydraulic component, (b) a high-pressure conduit connected at one end thereof to the high-pressure accumulator via a first check valve, (c) a high-pressure pump connected to the other end of the high-pressure conduit, to supply the high-pressure accumulator with the fluid under the high pressure, (d) a charging accumulator of a piston type including a piston and having a storage chamber connected to the high-pressure pump, for storing the fluid under a low pressure lower than that of the fluid in the high-pressure accumulator, and supplying the high-pressure pump with the fluid under the low pressure, and (e) a charging pump for supplying the charging accumulator with the fluid under the low pressure, wherein the improvement comprises: a generally cylindrical buffer piston closed by a bottom wall thereof at one of its opposite axial ends, and fluid-tightly received in a housing of the charging accumulator such that the buffer piston is slidable over a predetermined distance, the buffer piston slidably receiving therein a piston of the charging accumulator, and cooperates with the piston to define therebetween a storage chamber; leak means for permitting the fluid stored in the storage chamber, to leak at a low rate; a first communication passage provided for communication between the high-pressure conduit and a buffer chamber formed on one of opposite sides of the bottom wall of the buffer piston remote from the storage chamber; a second communication passage formed through the bottom wall of the buffer piston, for communication between the buffer chamber and the storage chamber; a second check valve disposed in the second communication passage, for preventing a flow of the fluid from the buffer chamber toward the storage chamber; a valve actuator is provided on one of the piston of the charging accumulator and a valve member of the second check valve, the valve actuator being abuttable on the other of the piston and the valve member to open the second check valve when the piston is placed in an advanced position thereof at which a volume of the storage chamber is minimum; and a spring for biasing the buffer piston toward the buffer chamber, a biasing force of the spring being determined so as to hold the buffer piston at an advanced position thereof even when a pressure necessary to retract the piston of the charging piston is applied to the buffer piston, the biasing force being further determined so as to allow the buffer piston to be retracted from the advanced position against the biasing force when the pressure in the buffer chamber falls within a range between the pressure necessary retract the piston of the charging accumulator and a lower limit of the high-pressure accumulator.

In the pressure generating device according to the above aspect of the invention, when the high-pressure pump is started, the fluid pumped by this pump is first fed into the storage chamber of the charging accumulator through the second check valve, which is open at the time of starting of the high-pressure pump. After the second check valve is closed with the charging accumulator piston retracted a given distance, the fluid delivered by the high-pressure pump is absorbed in the buffer chamber, pushing the buffer piston toward the retracted position. When the buffer piston is retracted to its fully retracted position at which the volume of the buffer chamber is maximum, the pumped fluid can no more be absorbed in the buffer chamber, whereby the pumped fluid is delivered to the high-pressure accumulator. Therefore, the intended or nominal high pumping load is not applied to the pump driving device, even after the second check valve is closed, until the buffer piston has reached the fully retracted position, namely, until an amount of the pumped fluid corresponding to the maximum volume of the buffer chamber is absorbed by the retracting movement of the buffer piston. By this time, the pump device (including the charging and high-pressure pumps) has been accelerated to a level near the nominal operating speed, and the inertia load applied to the pump device has been considerably reduced.

Thus, the commencement of the fluid delivery from the high-pressure pump to the high-pressure accumulator is delayed by the retracting movements of the charging accumulator piston and the buffer piston. The delay time after the closure of the second check valve is determined by the operating time of the high-pressure pump necessary to fill the buffer chamber. This assures improved accuracy of control of the time during which the pump motor 80 is freed from the initial high pumping load.

Further, the instant pressure generating device may be free from a sudden change in the pumping load upon commencement of the fluid delivery to the high-pressure accumulator. Namely, the biasing force of the spring increases as the buffer piston is pushed to the retracted position. If the characteristics of the spring biasing the buffer piston is determined so that the biasing force when the buffer piston has reached the retracted position, corresponds to the pumping pressure at which the pumped fluid is delivered from the hihg-pressure pump to the high-pressure accumulator. In this instance, a considerable change in the pumping load of the pump device upon starting of the fluid delivery to the high-pressure accumulator can be avoided.

In view of the above, it is considered possible that the buffer piston is used primarily for avoiding a sudden change in the pumping load when the high-pressure pump starts to deliver the pumped fluid to the high-pressure accumulator. In this case, the protection of the pump device from an initial high pumping load upon starting can be achieved by suitable means other than the buffer piston, for holding the second check valve open until the piston of the charging accumulator has been retracted a considerable distance. For example, the pump device can be freed from the initial high pumping load for a longer period of time after the start, by increasing the lift amount of the check valve, or by using a valve actuator which is slidable relative to the charging accumulator piston.

The pressure generating device according to the above aspect of the invention is also capable of depressurizing the high-pressure conduit through the leak means after the device is turned off, as previously discussed in detail.

BRIEF DESCRIPTION OF THE DRAWINGS

The above and other objects, features and advantages of the present invention will be better understood by reading the following detailed description of preferred embodiments of the invention, when considered in connection with the accompanying drawings, in which.

DETAILED DESCRIPTION OF THE PREFERRED EMBODIMENTS

Figure 1:
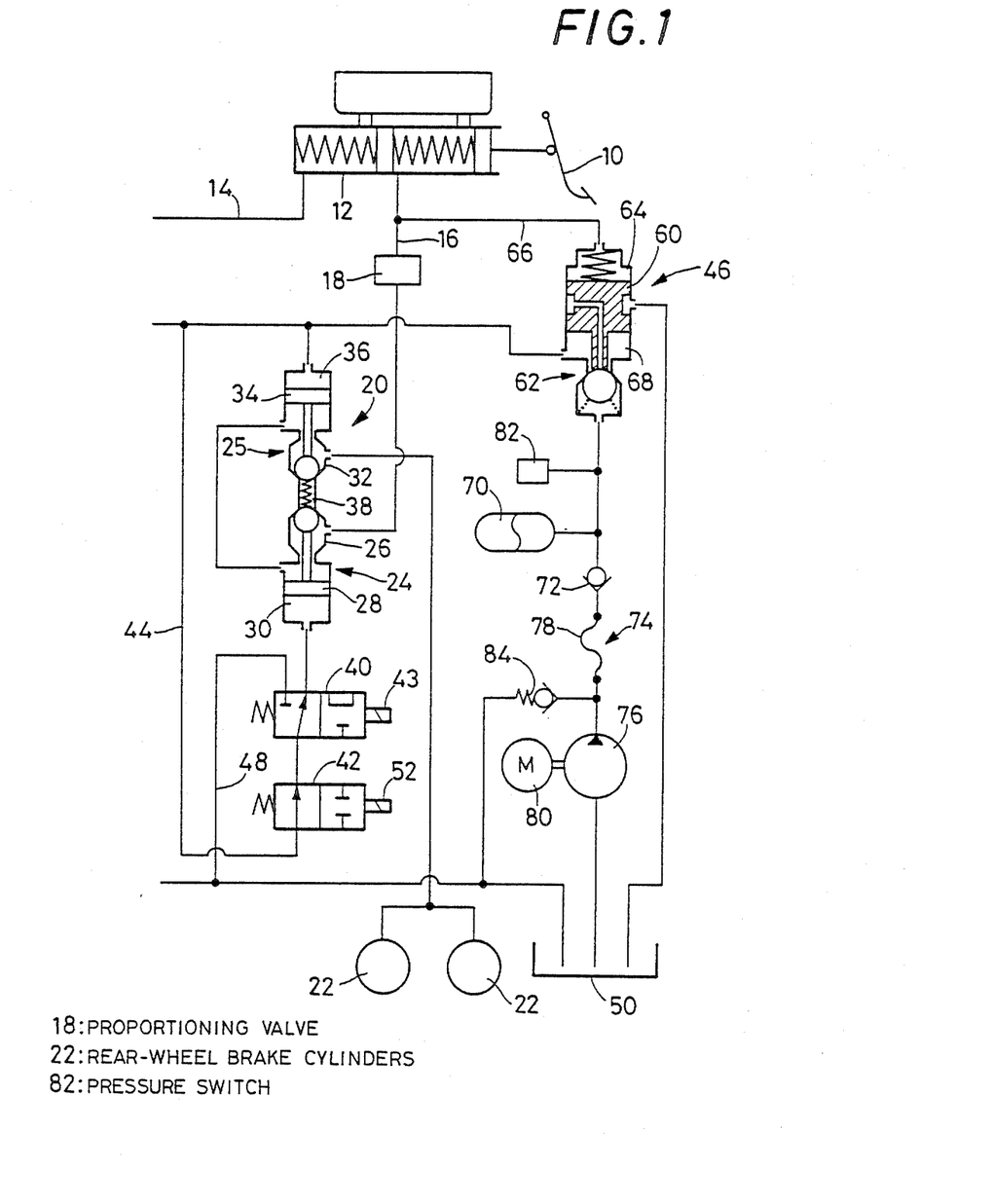
FIG. 1 is a schematic view showing a part of an anti-skid hydraulic braking system equipped with one embodiment of a pressure generating device adapted to protect a flexible high-pressure conduit of the system.

Referring first to FIG. 1, there is shown an anti-skid or anti-lock hydraulic braking system for an automotive vehicle, wherein reference numeral 10 designates a brake pedal, while reference numeral 12 designates a master cylinder. The master cylinder 12 is of a tandem type in which two mutually independent pressure chambers are formed in tandem. Fluid pressures generated in the two pressure chambers are applied through respective passages 14, 16 to a pair of front-wheel brake cylinders (not shown), and to a pair of rear-wheel brake cylinders indicated at 22 in the figure by way of example.

The passage 16, which connects the master cylinder 12 and the rear-wheel brake cylinders 22, is provided with a proportioning valve 18 and a pressure regulating device 20. The proportioning valve 18 is adapted to lower the pressure from the master cylinder 12, in a predetermined proportion. Since this proportioning valve is well known in the art, no further description is provided. The pressure regulating device 20 includes a pressure control section 24 and a by-pass section 25. The pressure control section 24 has a directional control valve 26 and a pressure control piston 28, and operates to regulates the pressures in the rear-wheel brake cylinders 22, according to the pressure in a pressure chamber 30. The by-pass section 25 includes a directional control valve 32 and a by-pass piston 34, and operates to effect direct communication of the master cylinder 12 with the rear-wheel brake cylinders 22 through a by-pass passage 38, when no pressure is applied to a pressure chamber 36.

The pressure in the pressure chamber 30 of the pressure control section 24 is controlled by a first solenoid-operated control valve 40 and a second solenoid-operated control valve 42. The first solenoid-operated control valve 40 is operated by means of energization and deenergization of a solenoid 43, between a first and a second position. In the first position, the pressure chamber 30 is placed in communication with a regulator 46 via the second solenoid-operated control valve 42 and a passage 44. In the second position, the pressure chamber 30 is in communication with a reservoir 50 via a passage 48. Thus, the pressure in the pressure chamber 30 is raised or lowered by the first solenoid-operated control valve 40. The second solenoid-operated control valve 42 is operated by controlling a duty cycle of an energization pulse current applied to a solenoid 52, which regulates a ratio of a time during which the valve 42 is open, to a time during which the valve 42 is closed. This duty cycle control permits adjustment of a rate at which the pressure in the pressure chamber 30 is raised or lowered. Namely, the solenoid-operated control valves 40, 42 serve to regulate the pressures in the rear-wheel brake cylinders 22, indirectly via the pressure regulating device 20, in order to prevent the rear wheels of the vehicle from being locked. The solenoids 43 and 52 are energized and deenergized by a controller whose major portion is constituted by a microcomputer. Since the control of these solenoids 43, 52 is well known, no further description is deemed necessary.

The regulator 46 indicated above includes a control piston 60, and a directional control valve 62. A pressure chamber 64 is formed on one side of the control piston 60, and is connected by a passage 66 to the master cylinder 12, to receive the master cylinder pressure. The control piston 60 is operated according to changes in the master cylinder pressure, to place the directional control valve 62 selectively in one of three positions: a first position in which a pressure chamber 68 formed on the other side of the piston 60 communicates with a high-pressure accumulator 70; a second position in which the pressure chamber 68 communicates with the reservoir 50; and a third position in which the pressure chamber 68 communicates with none of the accumulator 70 and the reservoir 50. Thus, the regulator 60 operates to lower the pressure from the high-pressure accumulator 70, to a level which is higher than the master cylinder pressure by a suitable amount. The lowered pressure is supplied from the regulator 60 to the second solenoid-operated control valve 42 and to the pressure regulating device 20.

The high-pressure accumulator 70 is connected to one end of a high-pressure conduit 74 via a first check valve 72. The other end of the high-pressure conduit 74 is connected to a pump device 76. A portion of the high-pressure conduit 74 consists of a flexible rubber hose 78. The pump device 76 is driven by a pump motor 80 which is turned on and off in response to a signal from a pressure switch 82 that is adapted to sense the pressure within the high-pressure accumulator 70. Thus, the pressure in the accumulator 70 is maintained within a predetermined range. Reference numeral 84 indicates a pressure relief valve.

As is apparent from the above explanation, the present braking system uses a pressure generating device which is constituted by the high-pressure accumulator 70, the high-pressure conduit 74, the pump device 76, etc. The pump device 76, which constitutes a major portion of the pressure generating device, is illustrated in detail in FIG. 2, As shown in the figure, the pump device 76 incorporates a charging pump 92, a charging accumulator 94 and two high-pressure pumps 96, which are all accommodated within a single block 90. The pump device 76 sucks in the fluid through a suction port 98, and pressurizes the sucked fluid in two steps. The pressurized fluid is discharged through a discharge port 100.

Figure 2:
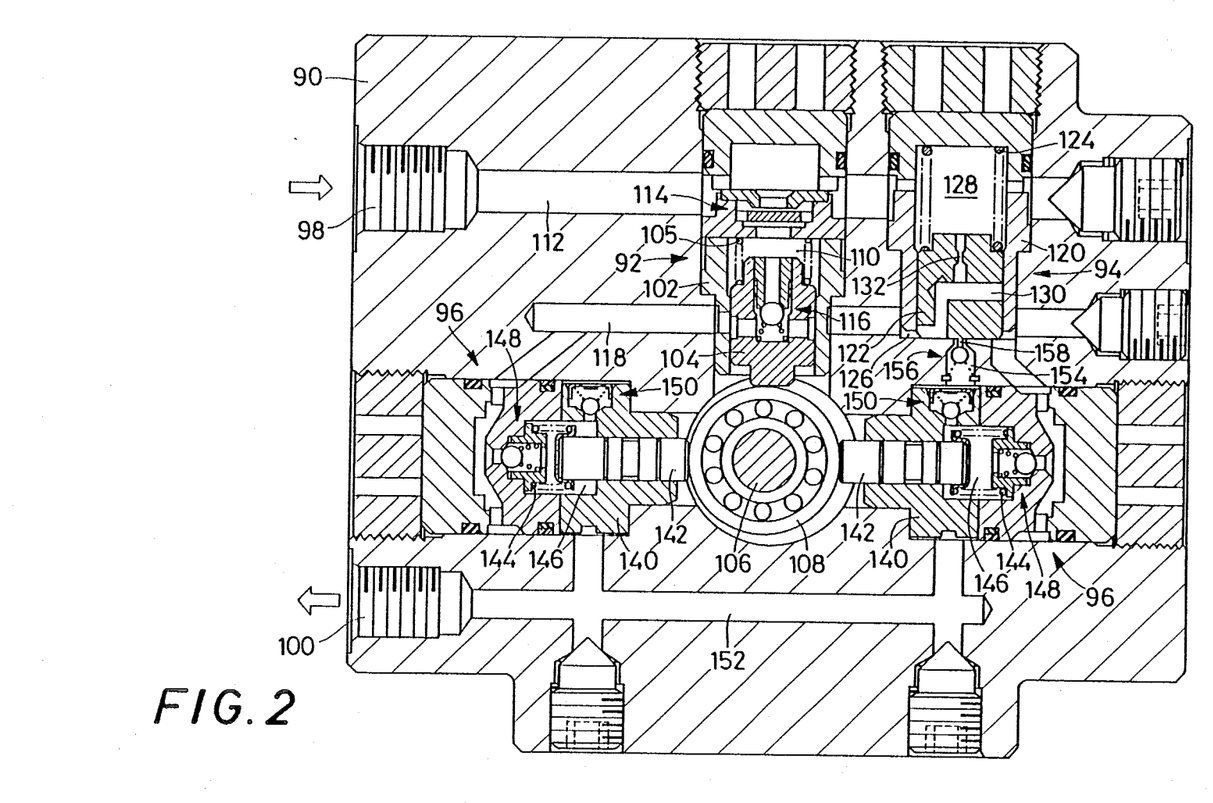
FIG. 2 is an elevational view in cross section of a pump device which constitutes a major portion of the pressure generating device.

The charging pump 92 includes a plunger 104 slidably received in a housing 102, in a substantially fluid-tight manner. The plunger 104 is biased by a spring 105 in an axial direction, and is held in an eccentric drive shaft 106 via a bearing 108. With the eccentric shaft 106 rotated by the pump motor 80, the plunger 104 is reciprocated so as to alternately increase and decrease a volume of a pump chamber 110, whereby the fluid is sucked through a suction passage 112 and a suction valve 114 and discharged into a charging passage 118 through a discharge valve 116. The charging passage 118 is branched into two lines leading to the two high-pressure pumps 96. The charging passage 118 is also connected to the charging accumulator 94.

The charging accumulator 94 includes a piston 122 which is slidably and substantially fluid-tightly received in a housing 120. The piston 122 cooperates with the housing 120 to define a storage chamber 126 and a low-pressure chamber 128 on opposite sides of the piston 122. The piston 122 is biased by a spring 124 in an axial direction toward the storage chamber 126. The storage chamber 126 communicates with the charging passage 118, while the low-pressure chamber 128 communicates with the suction passage 112. The piston 122 has a relief passage 130 which opens at one end in the storage chamber 126. The other end of the passage 130 is open in the outer circumferential surface of the piston 122. The opening of the relief passage 130 on the surface of the piston 122 is normally substantially closed by the surface of the housing 120. When the piston 122 is retracted a predetermined distance from its fully advanced position due to an increase in the fluid stored in the storage chamber 126, the relief passage 130 is brought into communication with the low-pressure chamber 128, thereby permitting the fluid in the storage chamber 126 to flow into the low-pressure chamber 128. The storage chamber 126 is normally in communication with the low-pressure chamber 128 through the relief passage 130 and an orifice 132. Thus, the orifice 132 serves as leak means which permits the fluid in the storage chamber 126 to leak into the low-pressure chamber 128 at a low rate. However, the leak means may be provided by providing a suitable clearance between the piston 122 and the housing 120, so that the fluid may leak through the clearance.

Each of the high-pressure pumps 96 includes a plunger 142 which is slidably and substantially fluid-tightly received in a housing 140. The plunger 142 is biased by a spring 144 and is held in contact with the eccentric drive shaft 106 via the bearing 108. With the eccentric drive shaft 106 rotated, the plunger 142 is reciprocated so as to alternately increase and decrease a volume of a pump chamber 146, whereby the fluid is sucked through the charging passage 118 and a suction valve 148 and discharged through a discharge valve 150, into a discharge passage 152 which forms a part of the high-pressure conduit 74. Since the charging accumulator 94 operates to positively charge the high-pressure pump 96 with the fluid pressurized by the charging pump 92, the high-pressure pump can operate to effect an efficient pumping action.

The discharge passage 152 is connected to the storage chamber 126 of the charging accumulator 94 via a communication passage 154. In this communication passage 154, there is disposed a second check valve 156 which operates to prevent a flow of the fluid from the discharge passage 152 toward the storage chamber 126. The piston 122 of the charging accumulator 94 is formed with a valve actuator in the form of a projection 158 which protrudes toward the valve member of the check valve 156. When the piston 122 is placed in its fully advanced or original position with no fluid stored in the storage chamber 126, the valve-actuator projection 158 abuts on the valve member of the check valve 156, thereby holding the check valve 156 open. While the valve actuator 158 is formed on the piston 122, the valve member of the second check vavle 156 may be formed with such a projection which is abuttable on the end face of the piston 122.

While a sufficient amount of a highly pressurized fluid is stored in the high-pressure accumulator 70 of the hydraulic braking system constructed as described above, the pump motor 80 is at rest, and the charging accumulator 94 is placed in the state shown in FIG. 2.

When the pressure in the high-pressure accumulator 70 has fallen below a predetermined lower limit, the pump motor 80 is turned on and the charging pump 92 and the two high-pressure pumps 96 are all started to operate. As soon as the pump motor 80 is activated, the charging pump 92 commences a pumping action to supply the charging accumulator 94 with a pressurized fluid. However, the high-pressure pumps 96 do not perform an effective pumping action immediately after the start of the motor 80, since the second check valve 156 is held open, causing the discharged fluid to return to the charging accumulator 94 through the communication passage 154. Therefore, the check valve 156 prevents the pump motor 80 from being subjected to a load due to pressurization of the fluid, in addition to a load due to an inertia upon starting of the pump device 76. Thus, the required capacity of the pump motor 80 is reduced, and the durability of the motor 80 is increased.

Since the delivery of the charging pump 92 is greater by a given amount than a sum of deliveries of the two high-pressure pumps 96, the fluid stored in the charging accumulator 94 increases as the pump device 76 continues to operate. When the piston 122 is retracted by a predetermined distance due to an increase in the fluid in the storage chamber 126, the valve-actuator projection 158 is separated from the valve member of the second check valve 156, whereby the communication passaage 154 is closed by the second check valve 156. Consequently, the fluid subsequently pumped by the high-pressure pumps 96 is delivered through the discharge port 100. Thus, the pump device 76 starts an effective pumping action.

When the amount of the fluid within the high-pressure accumulator 70 increases and its pressure reaches a predetermined upper limit, the pump motor 80 is turned off. At this time, the piston 122 of the charging accumulator 94 is in the retracted position at which the second check valve 156 is closed. Accordingly, the high-pressure fluid pressurized by the high-pressure pumps 96 is trapped within the high-pressure conduit 74. However, since the fluid stored in the storage chamber 126 of the charging accumulator 94 leaks at a low rate through the leak means in the form of the orifice 132, the piston 122 is slowly returned to its fully advanced or original position, whereby the projection 158 opens the check valve 156, permitting the fluid in the high-pressure conduit 74 to flow into the charging accumulator 94 through the communication passage 154. Thus, the high-pressure conduit 74 is depressurized, and is thus freed from a high pressure of the fluid otherwise trapped therein after the pump device 76 is turned off.

Figure 3:
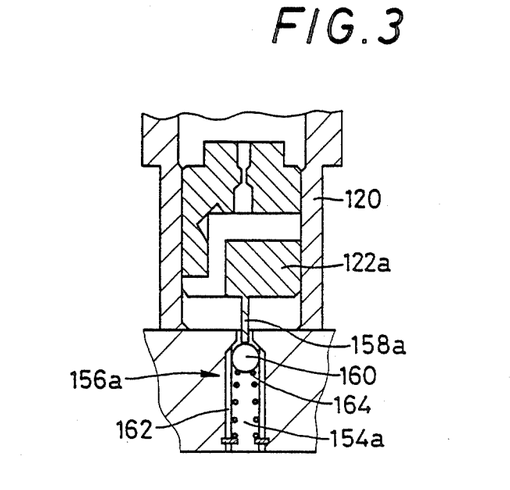
FIG. 3 is a fragmentary view of another embodiment of the invention also adapted to protect a pump against a high load upon starting.

As described above, the pump motor 80 is protected from being subjected to a pumping load for a relatively short period immediately after the start of the pump device 76. If it is desired to protect the pump motor 80 from an initial pumping load for a longer period, the pump device 76 may be modified as illustrated in FIG. 3. In this modified arrangement, the charging accumulator 94 has a piston 122a with a valve-actuator projection 158a which has a larger length than the projection 158 shown in FIG. 2. The projection 158a is abuttable on a valve member 160 of a second check valve 156a which has a larger lift with respect to the valve seat, than the valve member of the check valve 156 of the preceding embodiment. Because of the larger lift amount, the valve member 160 biased by a spring 164 is guided by protrusions 162 formed in the wall defining a communication passage 154a. In this case, the check valve 156a is held open until the piston 122a is retracted by a relatively large distance, i.e., until the fluid stored in the storage chamber of the charging accumulator 94 increases a relatively large amount. Consequently, the check valve is kept open for a comparatively long time, during which the pump motor 80 is freed from an initial pumping load. Preferably, the lift of the check valve 156a (the length of the projection 158a) is selected so that the valve 156a is held open for a period until a load applied to the pump motor 80 due to inertia of the motor 80, the drive shaft 106, and other associated movable components of the pump device 76 has been lowered to a predetermined level after the load has reached a maximum level after the pump motor 80 is turned on.

Figure 4:
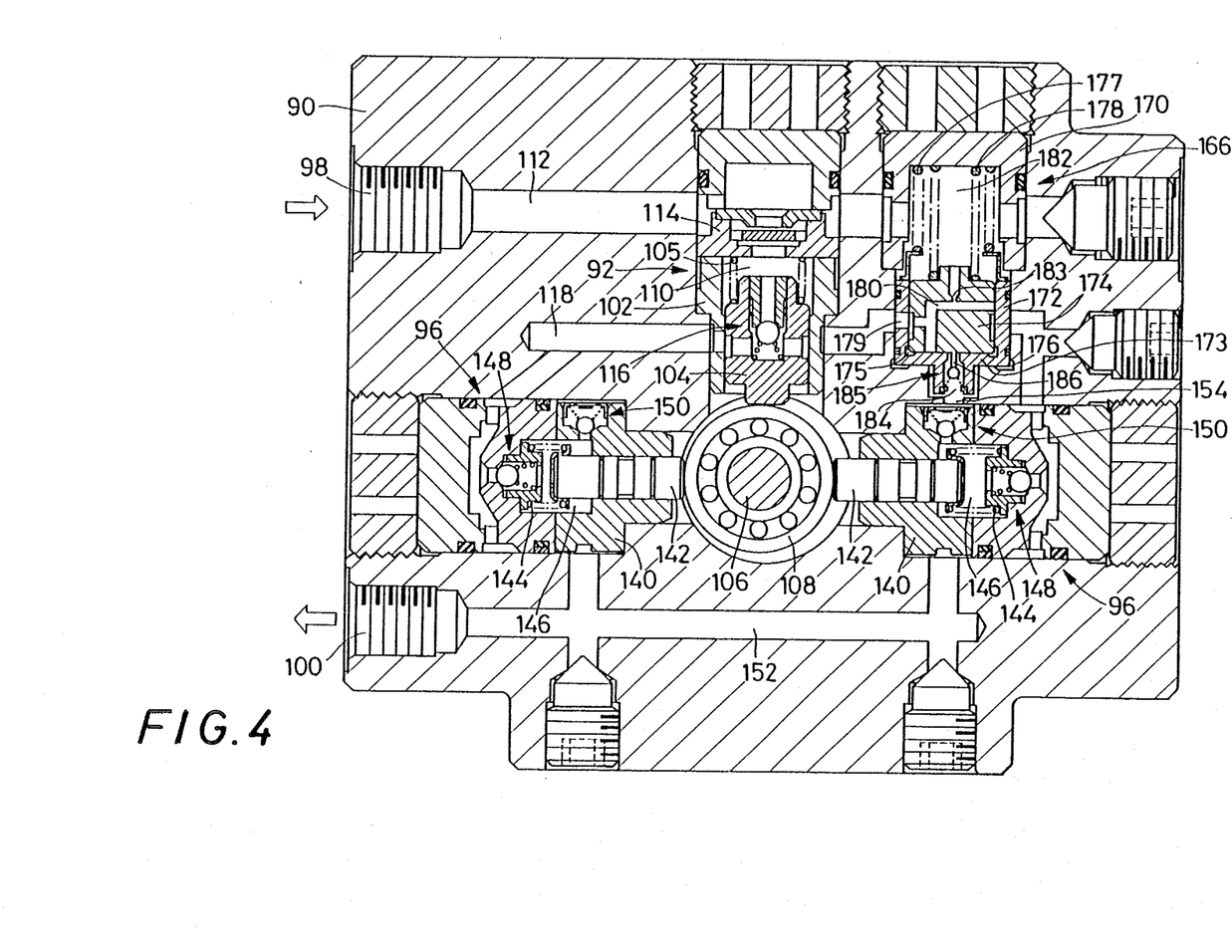
FIG. 4 is an elevational view corresponding to that of FIG. 2, showning a further embodiment of the pressure generating device of the invention having a modified arrangement for protecting the pump.
Figure 5:
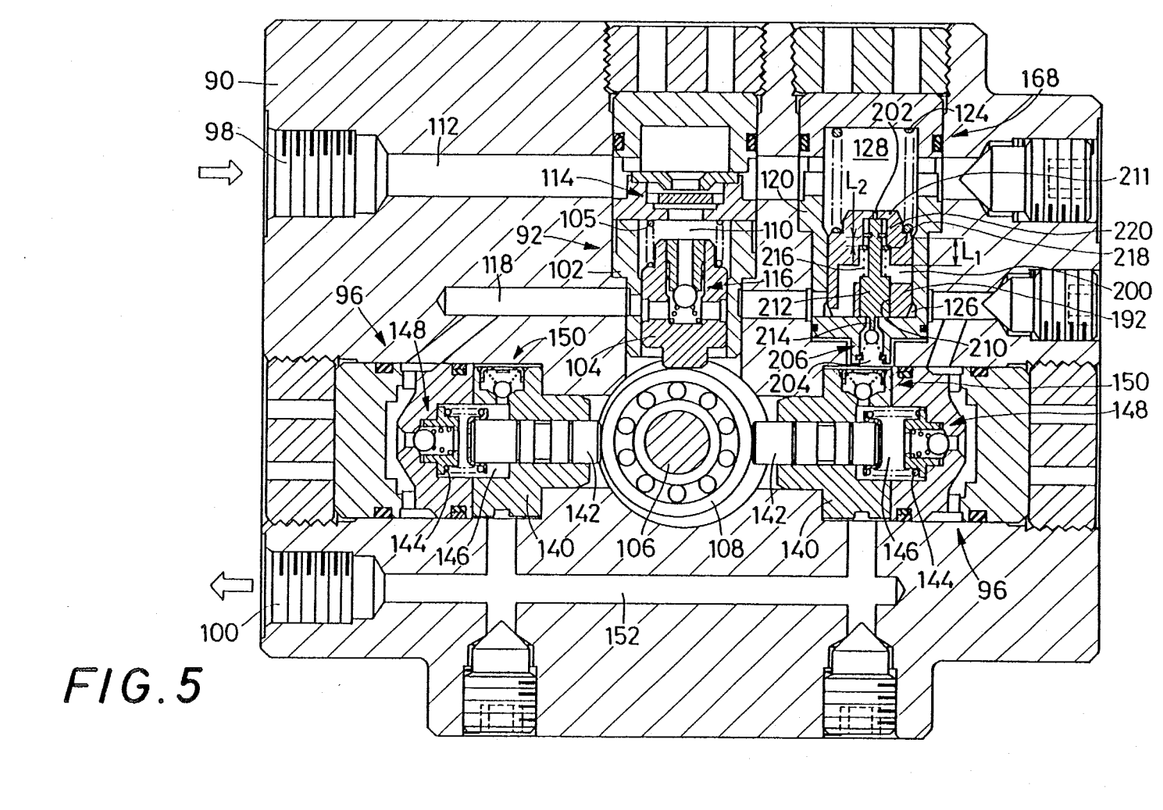
FIG. 5 is an elevational view corresponding to that of FIG. 2, showing a still further embodiment of the invention having another modified arrangement for protecting the pump.

Referring next to FIGS. 4 and 5, further embodiments of the present invention will be described. The same reference numerals as used in FIG. 2 are used in FIGS. 4 and 5 to identify the same elements. In the interest of brevity and simplification, there will be described only those elements of the present modified embodiment that differ from the corresponding elements of the preceding embodiment of FIGS. 1–2.

In the embodiment of FIG. 4, a charging accumulator 166 is accommodated in a housing which is made up of a cap member 170 and a part of the block 90. In the portion of the housing formed by tha above part of the block 90, there is slidably and fluid-tightly received a generally cylindrical buffer piston 172 which is closed by a bottom wall 173 at one of its oppoisite axial ends. A piston 174 is slidably received in the buffer piston 172, such that a storage chamber 175 is defined between the piston 174 and the buffer piston 172. Further, a buffer chamber 176 is formed on one side of the bottom wall 173 of the buffer piston 172 remote from the storage chamber 175. The buffer piston 172 is biased by a spring 177 in an advancing direction toward the buffer chamber 176, i.e., in a direction that causes the volume of the buffer chamber 176 to be reduced. Similarly, the piston 174 is biased by another spring 178 in an advancing direction toward the storage chamber 175. The buffer piston 172 is retractable by a maximum distance L until the piston 172 abuts on the open end of the cap member 170.

The above construction can be considered a modification of the preceding embodiments of FIGS. 2 and 3, in that the buffer piston 172 serves as a movable part of the housing of the piston 174 of the charging accumulator, the rest of the housing being stationary, such that a second check valve 185 (which will be described) is formed in the movable part of the housing (buffer piston) slidably and fluid-tightly fitted in the stationary part of the housing.

The storage chamber 175 of the charging accumulator 166 is normally held in communication with the previously indicated charging passage 118 through a passage 179 formed in the side wall of the buffer piston 172, and a relief passage 180 formed in the piston 174. Like the relief passage 130 of the preceding embodiment shown in FIG. 2, the relief passage 180 functions to effect fluid communication between the storage chamber 175 and the low-pressure chamber 182, When the piston 174 is retracted a predetermined distance relative to the buffer piston 172. In this fully retracted position of the piston 174, the fluid in the storage chamber 175 can flow into the low-pressure chamber 182 through the relief passage 180 which opens at its ends in the respective chambers 175, 182. As in the preceding embodiments, the piston 174 has leak means in the form of an orifice 183 which permits the fluid in the storage chamber 175 to leak into the low-pressure chamber 182 at a low rate, even before the piston 174 is placed in the retracted position relative to the buffer piston 172.

The storage chamber 175 is held in communication with the buffer chamber 176 through a communication passage 184 which is formed through a central part of the bottom wall 173 of the buffer piston 172. In this communication passage 184, there is disposed the second check valve 185 indicated above, in addition to the first check valve 72 shown in FIG. 1). The second check valve 185 serves to prevent a flow of the fluid from the buffer chamber 176 to the storage chamber 175. The piston 174 has a valve actuator in the form of a projection 186 which protrudes toward the valve member of the check valve 185, so that the projection 186 is abuttable on the valve member in the form of a ball disposed in the passage 184. More specifically, the projection 186 is held in abutting contact with the valve member of the check valve 185, while keeping the valve member away from its seat, when the piston 174 is placed in its fully advanced position indicated in FIG. 4.

In the present embodiment, the discharge passage 152 connecting the high-pressure pumps 96 and the high-pressure conduit 74 is connected to the buffer chamber 176 by the communication passage 154. This passage 154 is referred to as a first communication passage, whereas the communication passage 184 communicating with the storage and buffer chambers 175, 176 is referred to as a second communication passage.

In the hydraulic braking system incorporating the pump device of FIG. 4 described above, the buffer piston 172 and the piston 174 are placed in their fully advanced positions while the pump motor 80 is at rest with a sufficient amount of fluid stored in the high-pressure accumulator 70. In this condition, the volumes of the storage and buffer chambers 175, 176 are minimum, and the second check valve 185 is oepn, allowing fluid communication between the two chambers 175, 176.

When the pump motor 80 is turned on with the pressure in the high-pressure accumulator 70 lowered below the predetermined lower limit, the charging pump 92 and the high-pressure pumps 96 are simultaneously started. As in the preceding embodiment of FIG. 2, the charging pump 92 commences an effective pumping action upon starting of the pump motor 80, whereas the high-pressure pumps 96 do not achieve an effective pumping operation until the second check valve 185 is closed. That is, as long as the check valve 185 is held open, the fluid pumped by the high-pressure pumps 96 is fed into the storage chamber 175. As the fluid in the storage chamber 175 increases, the piston 174 is retracted relative to the buffer piston 172. Eventually, the check valve 185 is closed when the piston 174 is moved to its fully retracted position relative to the buffer piston 172. Subsequently, the fluid pumped by the pumps 96 is absorbed by the buffer chamber 176, and buffer piston 172 is retracted. The characteristics of the biasing springs 177, 178 are determined so as to control the charging accumulator 166 and the check valve 185 as described above. More specifically, the biasing forces of the springs 177, 178 are determined so as to hold the buffer piston 172 in its fully advanced position even when a pressure necessary to retract the piston 174 is applied to the buffer chamber 176 (acts on the buffer piston 172), and so as to allow the buffer piston 172 to be retracted from the advanced position against the biasing force of the spring 177 when the pressure in the buffer chamber 176 exceeds the pressure necessary to retract the piston 174, more precisely, when the pressure acting on the buffer piston 172 becomes higher, by a predetermined amount, than a pressure at which the check valve 185 is closed. Thus, for a certain period of time, the pump motor 80 is protected from a high load necessary to produce an intended high pressure to charge the high-pressure accumulator 70. Namely, for that period, the motor 80 is subjected to a relatively low load, which is a sum of a load substantially equal to the pressure at which the charging accumulator 166 starts to store the fluid in the storage chamber 175, and a load due to inertia of the motor 80 and the associated components of the pump device 76. Therefore, the starting load of the pump motor 80 is reduced, and the durability of the pump device 76 is accordingly improved.

As the fluid is pumped by the high-pressure pumps 96, the buffer piston 172 is retracted to its fully retracted position at which the piston 172 abuts on the end face of the cylindrical cap member 170. In this position, the volume of the buffer chamber 176 is maximum, and the pumped fluid can no more be absorbed in the buffer chamber 176, whereby the pumped fluid is delivered to the high-pressure accumulator 70 through the discharge port 100. That is, the intended or nominal high pumping load is not applied to the pump motor even after the second check valve is closed, until the buffer piston 172 has reached the fully retracted position, namely, until an amount of the pumped fluid corresponding to the maximum volume of the buffer chamber 176 is absorbed by the retracting movement of the buffer piston 172. By this time, the inertia load applied to the pump motor 80 is almost zeroed. Thus, the commencement of the fluid delivery from the high-pressure pumps 96 to the high-pressure accumulator 70 after the closure of the second check valve 185 is delayed by the retracting movement of the buffer piston 172. This delay time is determined by the operating time of the pumps 96 necessary to fill the buffer chamber 176. This assures improved accuracy of control of the time during which the pump motor 80 is freed from the initial high pumping load.

It is also noted that a sudden change in the pumping load upon commencement of the delivery to the high-pressure accumulator 70 can be prevented by suitably selecting the biasing characteristics of the spring 177 biasing the buffer piston 172. Described in more detail, the biasing force of the spring 177 increases as the buffer piston 172 is pushed to the fully retracted position. If the biasing force of the spring 177 is determined so that the biasing force when the buffer piston 172 has reached the fully retracted position, corresponds to the pumping pressure at which the pumped fluid is delivered from the hihg-pressure pumps 96 to the high-pressure accumulator 70. In this instance, a considerable change in the pumping load of the pump motor 80 upon starting of the fluid delivery to the high-pressure accumulator can be avoided.

In view of the above aspect of operation of the instant embodiment, it is possible that the buffer piston 172 is used primarily for gradually increasing the pumping load to the final operating level, in order to avoid a sudden change in the pumping load when the pumps 96 start to deliver the pumped fluid to the high-pressure accumulator 70. In this case, the protection of the pump motor 80 from an initial high pumping load upon starting can be achieved by suitable means other than the buffer piston 172, for holding the check valve 185 open until the piston 174 of the charging accumulator 166 has been retracted a considerable distance. For example, the pump motor 80 can be freed from the initial high pumping load for a longer period of time after the start, by increasing the lift amount of the check valve 185 and by increasing the length of the valve actuator projection 186, or by using a valve actuator which is slidable relative to the piston 174 of the charging accumulator 166. Preferably, the time during which the check valve 185 is held open is selected to be long enough to allow the inertia load of the pump motor 80 to be lowered down to a considerably low level after the load has once reached the maximum level after the start of the pump motor 80.

When the pressure in the high-pressure accumulator 70 has been rasied above the preset upper limit, the pump motor 80 is turned off. In this state, the second check valve 185 is closed with the piston 174 in the retracted position. However, the fluid in the storage chamber 175 may leak into the low-pressure chamber 182 through the orifice 183, and consequently the piston 174 is slowly advanced. When the piston 174 has reached a near-advanced position a short distance before the fully advanced position, the projection 186 comes into abutment on the valve member of the check valve 185, thereby opening the check valve. As a result, the fluid in the buffer chamber 186 and the high-pressure conduit 74 may flow into the storage chamber 175 of the charging accumulator 166. Thus, the high-pressure conduit 74 is depressurized, and is therefore protected from the high-pressure fluid otherwise trapped therein while the pump device 76 is off.

As indicated in connection with the embodiment of FIG. 2, the valve actuator projection 186 may be replaced by a projection which protrudes from the valve member of the check valve 185 toward the end face of the piston 172, so that the check valve is opened by abutment of the projection on the end face of the piston 172.

There will next be described the embodiment of FIG. 5, wherein a charging accumulator is indicated at 168. This charging accumulator 168 includes a piston 192 which is slidably and substantially fluid-tightly received in the housing 120, and is biased by the spring 124. Like the piston 122 of the first embodiment of FIG. 2, the housing 120 and the piston 122 cooperate to define the storage chamber 126 and the low-pressure chamber 128 on opposite sides of the piston 122. The piston 122 has a relief passage 200 which opens at its one end in the storage chamber 126. The other end of the relief passage 200, which is normally closed by the surface of the housing 120, is brought into communication with the low-pressure chamber 128, when the piston 192 is retracted by a predetermined distance L1 from the fully advanced position of FIG. 5. This distance L1 is the maximum operating stroke of the piston 192. The piston 192 has leak means in the form of an orifice 132 which communicates with the relief passage 200 and the low-pressure chamber 128, so that the fluid in the storage chamber 126 may flow into the low-pressure chamber 128 at a low rate.

The discharge passage 152 is connected to the storage chamber 126 of the charging accumulator 168, through a communication passage 204 in which is disposed a check valve 206 similar to the check valve 156 of the first embodiment.

The piston 192 has a stepped bore 210 formed parallel to its axis. The stepped bore 210 is closed at its one end by a bottom wall 211 of the piston 192. A plunger 212 is slidably fitted in the stepped bore 210. The length of the plunger 212 is determined so that the front end of the plunger 212 is aligned with the front end of the piston 192 when the rear end of the plunger 212 is in abutting contact with the inner surface of the bottom wall 211 of the piston 192. The plunger 212 is formed with a valve-actuator projection 214, which protrudes from the front end of the plunger 212. The length of the projection 214 is determined so that the projection abuts on the valve member of the check vale 206, when the piston 192 is placed in the fully advanced position of FIG. 5, and the rear end of the plunger 212 in in abutting contact with the bottom wall 211.

Between the plunger 212 and the piston 192, there is disposed a spring 216 for biasing the plunger 212 in a direction toward the check valve 206 (toward the advanced position of the piston 192). The spring 216 bears at its one end on the plunger 212, and at the other end on the piston 192 via a spring retainer 218. The spring retainer 218 is movable relative to the piston 192 in the axial direction of the piston 192. An engagement portion in the form of a snap ring 220 is secured on the plunger 212, near the rear end of the plunger 212. A distance L2 between the snap ring 220 and the spring retainer 218 is smaller by a predetermined value than the maximum operating stroke L1 of the piston 192, so that the snap ring 220 abuts on the spring retainer 218 and bears the above-mentioned other end of the spring 216, before the piston 192 is moved to its fully retracted position. In this condition, both ends of the spring 216 bear on the plunger 212, whereby the spring 216 does not bias the plunger 212.

While the pump motor 80 is at rest, the second check valve 206 is open. Therefore, the intended high pumping load is not applied to the pump motor 80, immediately after the motor 80 is started, as previously described in connection with the preceding embodiments.

As the fluid in the storage chamber 126 increases due to a flow of the pumped fluid from the pumps 96 through the communication passage 204, the piston 192 of the charging accumulator 168 is retracted. Since the plunger 212 is biased by the spring 216 toward the check valve 206, the plunger 212 projects out of the stepped bore 210 of the pistion 192, by an amount equal to the retracting movement of the piston 192, while holding the check valve 206 in the open position.

However, when the piston 192 is retracted by the distance L2, the sna ring 220 comes into abutment on the spring retainer 218, whereby the spring 216 no more biases the plunger 216 toward the check valve 206. As a result, the spring of the check valve 206 pushes the plunger 212 via the valve member (in the form of a ball), thereby causing the valve member to be seated. Thus, the check valve 206 is closed, and the communication passage 204 is closed by the check valve. Subsequently, the fluid pumped by the high pressure pumps 96 is delivered through the discharge port 100, and therefore the intended pumping load is applied to the pump motor 80.

It is noted that since the fluid is delivered by the charging pump 92 in an intermittent manner, the piston 192 of the charging accumulator 168 is alternately advanced and retracted over a certain distance even when the pump device 76 is operated in a stable condition. Consequently, the projection 214 may abuts on the valve member of the check valve 206, and the biasing force of the spring 216 may act on the valve member, with the snap ring 220 separated from the spring retainer 218. However, once the check valve 206 has been closed, it will not be opened since a high pressure in the high-pressure conduit 74 (in the discharge passage 152) is acting on the valve member.

When the pressure in the high-pressure accumulator 70 exceeds the preset upper limit, the pump motor 80 is turned off with the check valve 206 in the closed position. The fluid in the storage chamber 126 leaks into the low-pressure chamber 128 through the orifice 202, and therefore the piston 192 is slowly advanced. Although the projection 214 abuts on the valve member of the check valve 206 and the biasing force of the spring 216 acts on the valve member before the piston 192 is fully advanced, the check valve 206 is not opened for the reason described above. When the piston 192 is moved to the near-advanced position near the fully advanced position, the bottom wall 211 of the piston 192 abuts on the rear end face of the plunger 212, and the biasing force of the spring 124 is exerted on the valve member of the check valve 206 via the piston 192 and the plunger 212. As a result, the check valve 206 is opened against the pressure in the high-pressure conduit 74, and the fluid flows from the high-pressure conduit 74 into the charging accumulator 168. In this way, the high-pressure conduit 74 is depressurized, as in the preceding embodiments.

It will be understood from the above description that the bottom wall 211 of the piston 192 defining the depth of the stepped bore 210 serves as a stopper for limiting the retracted position of the plunger 212 relative to the piston 192, whereas the snap ring 220 serves as an engagement portion which engages the spring retainer 218 to prevent the spring 216 from biasing the plunger 212 after the piston 192 is retracted the predetermined distance L2. These stopper 211, spring 216, spring retainer 218 and engagement portion 220 cooperate to constitute valve control means for holding the plunger 212 stationary to hold the check valve 206 open before the piston 192 is retracted the predetermined distance L2 from the fully advanced position at which the volume of the storage chamber 126 is minimum. The valve control means allows the check valve 206 to be closed when the piston 192 is retracted the predetermined distance L2. Further, the valve control means is operable to open the check valve 206 against the pressure in the high-pressure conduit 74, when the pistion is advanced to the near-advanced position due to the leakage of the fluid from the storage chamber 126 through the orifice 202 into the low-pressure chamber 128 after the pump motor 80 is turned off.

In the embodiment described just above, the spring retainer 218 may be scured to the piston 192. In this case, the distance of movement of the plunger 212 relative to the piston 192 is determined by a distance between the bottom wall 211 of the piston 192 and the spring retainer 218 fixed to the piston 192, which is smaller than the operating stroke of the piston 192. More particularly, when the piston 192 is retracted by the distance L2, the snap ring 220 and the spring retainer 218 abut on each other, and thereafter the piston 192 and the plunger 212 are retracted as a unit. When the piston 192 is advanced to the position near the fully advanced position, the rear end of the plunger 212 abuts on the bottom wall 211, and thereaafter the piston and the plunger 212 are advanced as a unit. Thus, stop means is provided by the bottom wall 211, a spring retainer 218 and snap ring 220, for defining a range of relative movement of the piston 192 and the plunger 212. The stop means 211, 218, 220 functions to cause the plunger 212 to move together with the piston 192 over distances outside the range of relative movement of the piston 192 and plunger 212, to and from the fully advanced position and the fully retracted position of the piston which define the operating stroke L1 of the piston 192. This stop means cooperates with the spring 216 to constitute the valve control means described above.

The use of the stopper 211 and the stop means 211, 218, 220 as described above is not essential to the embodiment of FIG. 5. For example, the spring 216 may serve alone as valve control means, if the spring characteristics is suitably selected. Namely, the spring 216 may be adapted so that its biasing force when the piston 192 is at a position near the fully advanced position is sufficient to open the check valve 206 against the pressure in the high-pressure conduit 74, and so that the biasing force when the piston 192 is retracted a suitable distance L2 smaller than the maximum operating stroke L1, allows the check valve 206 to be closed.

Although the illustrated embodiments are all adapted to be used for a hydraulic braking system for an automotive vehicle, the present invention may be embodied as a pressure generating device for other applications.

While the present invention have been described in its preferred embodiments with a certain degree of particularity, it is to be understood that the invention is not limited to the details of the illustrated embodiments, but various changes, modifications and improvements may be made in the invention, without departing from the scope of the invention defined in the following claims.

What is claimed is:

1. A pressure generating device having (a) a high-pressure accumulator for storing a fluid under a high pressure and delivering the fluid to a hydraulic component, (b) a high-pressure conduit connected at one end thereof to said high-pressure accumulator via a first check valve, (c) a high-pressure pump connected to the other end of said high-pressure conduit, to supply said high-pressure accumulator with the fluid under the high pressure, (d) a charging accumulator of a piston type including a piston and having a storage chamber connected to said high-pressure pump, for storing the fluid under a low pressure lower than that of the fluid in said high-pressure accumulator, and supplying said high-pressure pump with the fluid under the low pressure, and (e) a charging pump for supplying said charging accumulator with the fluid under the low pressure, wherein the improvement comprises:

said charging accumulator including leak means for permitting the fluid stored therein under the low pressure, to leak at a low rate;

a communication passage for communication between said high-pressure conduit and said storage chamber of said charging accumulator;

a second check valve disposed in said communication passage, and including a valve member for preventing a flow of the fluid from said high-pressure conduit toward said charging accumulator; and one of said piston of said charging accumulator and said valve member of said second check valve having a valve actuator which is operable for holding said second check valve open while no fluid is stored in said charging accumulator.

2. A pressure generating device according to claim 1, wherein said valve actuator consists of a projection which protrudes from one of said piston of the charging accumulator and said valve member of the second check valve.

3. A pressure generating device according to claim 1, wherein at least a part of said high-pressure conduit consists of a flexible hose.

4. A pressure generating device according to claim 1, wherein said second check valve is held open for at least a period until a load of said high-pressure pump due to an inertia is lowered to a predetermined level after said load has reached a maximum level after a start of said high-pressure pump.

5. A pressure generating device according to claim 1, wherein said valve actuator is provided on a plunger which is received in said piston slidably in an axial direction of said piston, and wherein valve control means is disposed between said plunger and said piston, said valve control means being operable to hold said plunger stationary to hold said second check valve open while said piston is retracted a predetermined distance from an advanced position thereof at which a volume of said storage chamber of said charging accumulator is minimum, said valve control means allowing said second check valve to be closed when said piston is retracted more than said predetermined distance from said advanced position, said valve control means opening said second check valve against the pressure in said high-pressure conduit, when said piston is advanced to a near-advanced position near said advanced position thereof.

6. A pressure generating device according to claim 5, wherein said valve control means comprises:

a spring for biasing said plunger toward said second check valve, said spring bearing at one end thereof on said plunger and at the other end thereof on said piston of said charging accumulator via a spring retainer which is movable in said axial direction;

an engagement portion provided on said plunger such that said engagement portion engages said spring retainer to prevent said spring from biasing said plunger when said piston is retracted more than said predetermined distance from said advanced position thereof; and a stopper provided on said piston such that said stopper abuts on said plunger when said piston is advanced to said near-advanced position, and thereby moves said plunger and said piston as a unit while said piston is further advanced to said advanced position thereof.

7. A pressure generating device according to claim 6, wherein said valve control means comprises:

a spring disposed between said piston of said charging accumulator and said plunger, for biasing said plunger toward said second check valve; and stop means for defining a range of relative movement between said piston and said plunger, such that said distance is smaller than a maximum operating stroke of said piston, said stop means causing said plunger to move together with said piston over distances outside said range of relative movement, to and from said advanced position and a retracted position of said piston which determine said maximum operating stroke.

8. A pressure generating device according to claim 5, wherein said valve control means comprises a spring disposed between said piston of said charging accumulator and said plunger, for biasing said plunger toward said second check valve, a biasing force of said spring being sufficient to open said second check valve against the pressure in said high-pressure conduit when said piston is placed in said advanced position, said biasing force being determined to allow said second check valve to be opened after said piston is retracted said predetermined distance from said advanced position thereof.

9. A pressure generating device having (a) a high-pressure accumulator for storing a fluid under a high pressure and delivering the fluid to a hydraulic component, (b) a high-pressure conduit connected at one end thereof to said high-pressure accumulator via a first check valve, (c) a high-pressure pump connected to the other end of said high-pressure conduit, to supply said high-pressure accumulator with the fluid under the high pressure, (d) a charging accumulator of a piston type including a piston and having a storage chamber connected to said high-pressure pump, for storing the fluid under a low pressure lower than that of the fluid in said high-pressure accumulator, and supplying said high-pressure pump with the fluid under the low pressure, and (e) a charging pump for supplying said charging accumulator with the fluid under the low pressure, wherein the improvement comprises:

a generally cylindrical buffer piston closed by a bottom wall thereof at one of its opposite axial ends, and fluid-tightly received in a housing of said charging accumulator such that said buffer piston is slidable over a predetermined distance, said buffer piston slidably receiving therein a piston of said charging accumulator, and cooperates with said piston to define therebetween a storage chamber;

leak means for permitting the fluid stored in said storage chamber, to leak at a low rate;

a first communication passage provided for communication between said high-pressure conduit and a buffer chamber formed on one of opposite sides of said bottom wall of said buffer piston remote from said storage chamber;

a second communication passage formed through said bottom wall of said buffer piston, for communication between said buffer chamber and said storage chamber;

a second check valve disposed in said second communication passage, for preventing a flow of the fluid from said buffer chamber toward said storage chamber;

a valve actuator is provided on one of said piston of said charging accumulator and a valve member of said second check valve, said valve actuator being abuttable on the other of said piston and said valve member to open said second check valve when said piston is placed in an advanced position thereof at which a volume of said storage chamber is minimum; and a spring for biasing said buffer piston toward said buffer chamber, a biasing force of said spring being determined so as to hold said buffer piston at an advanced position thereof even when a pressure necessary to retract said piston of the charging accumulator is applied to said buffer piston, said biasing force being further determined so as to allow said buffer piston to be retracted from said advanced position against said biasing force when the pressure in said buffer chamber falls within a range between said pressure necessary to retract said piston of the charging accumulator and a lower limit of said high-pressure accumulator.

10. A pressure generator device according to claim 9, wherein said second check valve is held open for at least a period until a load of said high-pressure pump due to an inertia is lowered to a predetermined level after said load has reached a maximum level after a start of said high-pressure pump.

* * * * *